US007213587B2

(12) United States Patent
Rütten

(10) Patent No.: US 7,213,587 B2
(45) Date of Patent: May 8, 2007

(54) ADJUSTABLE TWO-WAY VALVE DEVICE FOR A COMBUSTION ENGINE

(75) Inventor: Peter Rütten, Geilenkirchen (DE)

(73) Assignee: Pierburg GmbH, Neuss (DE)

( * ) Notice: Subject to any disclaimer, the term of this patent is extended or adjusted under 35 U.S.C. 154(b) by 0 days.

(21) Appl. No.: 11/206,973

(22) Filed: Aug. 19, 2005

(65) Prior Publication Data

US 2006/0037594 A1 Feb. 23, 2006

(30) Foreign Application Priority Data

Aug. 19, 2004 (DE) ..................... 10 2004 040 221

(51) Int. Cl.
*F02M 25/07* (2006.01)
*F02B 47/08* (2006.01)
*F16K 31/02* (2006.01)
*F16K 5/00* (2006.01)

(52) U.S. Cl. ........................... 123/568.24; 251/129.11; 251/311

(58) Field of Classification Search ........... 123/568.11, 123/568.12, 568.18–568.21, 568.2, 568.23, 123/568.24, 568.25, 190 D, 80 D; 251/129.11, 251/129.12, 309–312, 128.11, 128.12
See application file for complete search history.

(56) References Cited

U.S. PATENT DOCUMENTS 5,740,785 A * 4/1998 Dickey et al. ......... 123/568.12
5,950,576 A 9/1999 Busato et al.
6,089,212 A * 7/2000 Piock et al. ............ 123/568.2
6,378,509 B1 4/2002 Feucht et al.
2002/0092510 A1* 7/2002 Sari et al. ................ 123/568.2

FOREIGN PATENT DOCUMENTS

| | | |
|---|---|---|
| DE | 2 232 705 | 1/1974 |
| DE | 198 12 702 A1 | 9/1999 |
| DE | 199 32 313 A1 | 1/2001 |
| DE | 100 25 877 A1 | 12/2001 |
| DE | 100 25 877 C2 | 4/2002 |
| DE | 101 01 412 A1 | 7/2002 |

OTHER PUBLICATIONS

Search Report issued in corresponding European patent application No. EP 05 01 3906 completed Aug. 30, 2005.
Office Action dated Aug. 7, 2005 in corresponding German Patent Application No. 10 2004 040 221.3.

* cited by examiner

*Primary Examiner*—Willis R. Wolfe, Jr.
(74) *Attorney, Agent, or Firm*—Griffin & Szipl, P.C.

(57) ABSTRACT

An adjustable two-way valve device is described that is embodied as a rotary valve. According to the invention the use of the rotary valve as a two-way valve is achieved by the skillful arrangement of passage openings of a valve plate with respect to control openings of a valve element. Thus it is possible to control mass or mixed flows independently of or dependent on one another with only one valve element. In particular a use in the field of exhaust gas recirculation with a bypass line and an exhaust gas cooler is advantageous, since mixed flows and thus temperatures can be run.

7 Claims, 2 Drawing Sheets

ADJUSTABLE TWO-WAY VALVE DEVICE FOR A COMBUSTION ENGINE

This application claims priority on DE 10 2004 040 221.3 filed Aug. 19, 2004, the entire disclosure of which is incorporated herein by reference.

BACKGROUND OF THE INVENTION

1. Field of the Invention

The invention relates to an adjustable two-way valve device for a combustion engine with a housing in which a first and a second outlet or inlet channel, a third outlet or inlet channel, and at least one valve element are arranged, whereby the at least one valve element is movable via a control unit such that a fluid connection can be produced at will between the first or the second outlet or inlet channel and the third outlet or inlet channel.

2. Background Art

Such two-way valve devices are known for example as combined exhaust gas recirculation and bypass valve devices in which two valve elements are activated translationally via a continuously adjustable control unit in order to reduce the emissions of a combustion engine in that in the warm-up phase the exhaust gas is conducted via the bypass channel and after heating of a catalyst, the exhaust gas is conducted via the EGR cooler of the combustion engine.

Accordingly, in DE 100 25 877 an exhaust gas recirculation system with a valve device is described, which valve device features one exhaust gas inlet and two exhaust gas outlets, whereby one of the exhaust gas outlets leads to a cooler and the other exhaust gas outlet is connected fluidly to a bypass channel that bypasses the cooler. In a housing between the exhaust gas inlet and the two exhaust gas outlets respectively a valve seat is arranged, which valve seats are governed respectively by a disk-shaped valve element. The valve elements are arranged on a valve rod that is movable translationally via a control unit, whereby the first valve element is fixed on a first valve rod and the second valve element, which is arranged closer to the control unit, is arranged immovably on a second tubular valve rod surrounding the first valve rod. The control unit is embodied so that two springs are arranged in the control unit, via which the two valve disks are pressed onto their valve seats in a tensioned position. The inner and outer valve rods are arranged so that they can be displaced with respect to one another, so that the pneumatic or electromotive control unit is embodied such that depending on the direction of movement, only one of the valve rods and thus also only one of the two valve elements is lifted from the corresponding valve seat.

Moreover in DE 198 12 702 A1, a valve arrangement for controlling a recirculated exhaust gas stream is described, whereby the latter is arranged downstream of a bypass channel and an exhaust gas cooler, so that this valve arrangement features two inlets and one outlet. The two valve elements arranged on the valve rod and each corresponding to a valve seat are respectively pressed onto the valve seat via two helical springs arranged in the channel. Each of the two valve elements features a hole in the middle through which the joint valve rod extends at least partly. Two coils are embodied on the valve rod, via which the valve elements can respectively be activated individually in the direction of opening against the spring force via the coil when the valve rod is activated, whereby the respective other valve element is to slide on the valve rod, since it is pressed onto the valve seat by the spring force.

Two-way valve devices in other fields of application are likewise known, whereby these are controlled electromagnetically as a rule. For example corresponding holes are arranged in the movable armature of the electromagnetic valves, which correspond to inlets or outlets embodied in the housing. These valves are usually embodied so that exactly two or three different positions of the armature can be controlled with respect to one another to connect the different paths. As a rule these are not continuously adjustable and for example are not suitable for regulated exhaust gas recirculation via a cooler or a bypass, since the movable armature situated in the stream would be too sensitive to soiling and sufficient flow cross-sections are not ensured in such valves.

Moreover from DE 101 01 412 A1 an exhaust gas recirculation device in the form of a rotary valve for a combustion engine is known. With this rotary valve, a disk-shaped switching element is rotated via a control unit. The switching element features control openings that correspond to passage openings in a valve plate, whereby these passage openings respectively form one end of individual channels leading to the air-intake channel system. However, such a valve cannot be used as a two-way valve device, since the outlet channels cannot be opened or closed individually, but always jointly and simultaneously, so that an identical mass flow is made available to each outlet channel.

In the known embodiments of two-way valve devices, the disadvantages of high cost and a large number of components are evident. It is very expensive to embody the control units with two meshing valve rods. Moreover there is a high sensitivity to soiling in embodiments with springs arranged in the channel and valve elements sliding on the valve rod, since rust deposits may form on the valve rod, as a result of which problem-free functioning is no longer ensured. In addition, the expense of production and assembly is very high due to the large number of components.

SUMMARY OF THE INVENTION

It is therefore the object of the invention to create an adjustable two-way valve device in which two mass flows are continuously adjustable independently of one another, whereby the number of components and thus the cost of assembly and production, as well as the size of the entire two-way valve device, are to be reduced. In addition, as far as possible only one individual valve element should be needed. As a result, cost and weight advantages are achieved. Usability in the field of exhaust gas recirculation is maintained via a high insensitivity to soiling.

A preferred embodiment of the invention is an adjustable two-way valve device for a combustion engine, comprising: a first outlet or inlet channel; a second outlet or inlet channel; a valve plate having a first passage opening of the first outlet or inlet channel and a second passage opening of the second outlet or inlet channel; a third outlet or inlet channel; and a rotary valve element having at least one control opening corresponding to one or both of the passage openings of the first and second outlet or inlet channels; wherein the valve element is disposed to controllably open or close fluid connections between the third outlet or inlet channel and one or both of the first and/or the second outlet or inlet channels, so that the openings corresponding to the first outlet or inlet channel and the second outlet or inlet channel are made independently of one another or dependent on one another. Through such an embodiment it is possible to ensure continuous adjustability with a single valve element. The construction of the two-way valve device is extremely simple and space-saving. Thus, cost and weight advantages can be achieved.

In a preferred form of embodiment said valve element comprises a valve disk, and at least one control opening of the valve element extends in a circumferential direction over an angular area a essentially equal to an angular area spanned by central axes of said two passage openings running through a central point of said valve plate. In such an embodiment it is possible both to block the flow to or from the third outlet or inlet channel completely and to close the two passage openings individually, whereby simultaneously a change in the mass flow through the respectively other outlet or inlet channel can be controlled. In addition it is possible to change the two mass flows, i.e. the mass flow through the first outlet or inlet channel and the second outlet or inlet channel independently of one another, whereby the total mass flow remains constant. In an embodiment in the exhaust gas field with cooler or bypass channel, it would thus be possible to run different temperatures at a constant mass flow. At the same time a mass flow change is possible at a constant temperature.

In an alternative form of embodiment, at least one said control opening of the valve element extends in a circumferential direction over an angular area $\beta$ essentially equal to an angular area made by connecting two outer, furthest-apart edges of said two passage openings with a central point of said valve plate. In such an embodiment it is again possible to close both channels and to continually adjust one of the channels in the mass flow, while the other is closed. Moreover a temperature adjustment with a changing mass flow dependent on the temperature is possible, since while the opening of one of the two first and second inlet and outlet channels remains constant, simultaneously the other remains adjustable.

In a preferred form of embodiment a first said control opening of said valve element extends in a circumferential direction over an angular area $\alpha$ essentially equal to an angular area spanned by central axes of said two passage openings running through a central point of said valve plate; a second said control opening of said valve element extends in a circumferential direction over an angular area $\beta$ essentially equal to an angular area made by connecting two outer, furthest-apart edges of said two passage openings with a central point of said valve plate; and said valve element features two essentially equally large closed surfaces between said two control openings. In such an embodiment all the advantages described above are realized by means of a single valve element. Both a complete closure of the passage openings is possible as well as a change of the mass flow at constant temperature. Moreover a mass flow adjustment depending on a temperature adjustment is possible and a temperature adjustment at constant mass flow.

In a preferred form of embodiment said two passage openings of said valve plate extend in a circumferential direction over an angular area of 45°, said angular area $\alpha$ is 50°, said first control opening extends over an angular area $\alpha$ of 50°; said second control opening extends over an angular area $\beta$ of 95°; and said two closed faces said valve disk extend respectively over an angular area $\gamma$ of 107.5°. With such an embodiment adequately large mass flows can be realized in spite of the realization of the above-described functions, and a small size and good strength are achieved.

Preferably said passage openings comprise valve seats disposed to serve as scrape edges facing said valve disk and surrounding respective ends of said first and second outlet or inlet channels. Such scrape edges as valve seats have the advantage that for example when used in the field of exhaust gas recirculation in spite of the temperatures and possibly present rust particles, these contaminants are scraped off by the scrape edges and by the rotating of valve disk and valve plate relative to one another, so that the valve is not sensitive to soiling.

Preferably said adjustable two-way valve device is disposed in an exhaust gas recirculation line; said first outlet or inlet channel is connected fluidly to an exhaust gas cooler; said second outlet or inlet channel is connected fluidly to a bypass channel bypassing the exhaust gas cooler; and said third outlet or inlet channel is connected to an air intake channel system or an exhaust manifold. Accordingly, the valve device is arranged in the exhaust gas stream either upstream or downstream of the exhaust gas cooler and the bypass line. Due to the large number of adjustment possibilities, such a two-way valve is particularly suitable for use in this area.

Thus a two-way valve device is created that with only one valve element combines a large number of adjustment functions, is insensitive to soiling, and features a high service life with small size.

An exemplary embodiment is shown in the Figures and is described below.

DETAILED DESCRIPTION OF THE INVENTION

Figure 1:
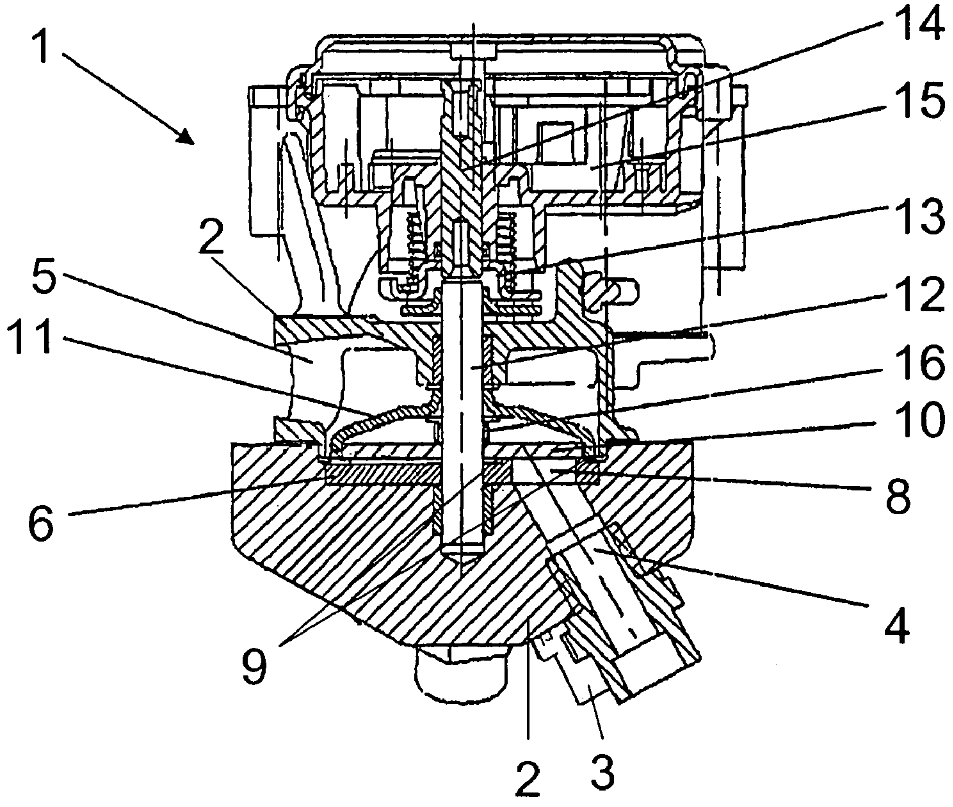
FIG. 1 shows a side view of an adjustable two-way valve device according to the invention in cross-section.

The two-way valve device 1 shown in FIG. 1 is embodied as a rotary valve and features a multi-part housing 2 in which three channels 3, 4, 5 are arranged. The first channel 3 can be arranged, for example, downstream of an exhaust gas cooler and thus can serve as an inlet channel for the rotary valve 1. The second channel 4 can be connected to a bypass channel bypassing an exhaust gas cooler and can likewise serve as an inlet channel. In this case, the channel 5 would be connected to an exhaust gas channel leading to an air intake channel system. However, as an alternative, it is also conceivable to use the third channel 5 as an inlet channel and to connect this to an exhaust manifold. The two channels 3, 4 serving as an outlet channel would then accordingly form the connections to an exhaust gas cooler and to a bypass channel bypassing the exhaust gas cooler. The respective ends of the channels 3 and 4 are formed by a valve plate 6 that features passage openings 7, 8 corresponding to the channels 3, 4, which can be embodied as polygonal, round, elliptical, etc. shapes. On the side facing the third channel 5, the passage openings 7, 8 are respectively surrounded by narrow bars that serve as valve seats or scrape edges 9.

A valve element 10, which is embodied as a valve disk, corresponds to these valve seats 9. When the pivot is rotated, this valve disk 10 is moved in a rotating manner via a catch 11, which is connected to the valve disk 10 so that it is unable to rotate and is likewise connected to a pivot 12 so that it is unable to rotate. The movement is transmitted via the pivot 12, a coupling element 13, which produces a connection between the pivot 12 and a shaft 14, and the shaft 14, which is part of a control unit 15 that is preferably driven by electromotive power. In order to ensure an adequate pressure of the valve disk 10 on the valve seat 9, a spring 16 is arranged in the housing 2, via which an axial force is transmitted to the pivot 12. The valve element or the valve disk 10 features one or more control openings 17, 18, via which a fluid connection from one or both of the inlet channels 3, 4 to the outlet channel 5 can be produced. The mass flow can be changed thereby by rotating the valve disk 10 on the valve plate 6 according to the cross-section opened thereby.

Figure 2:
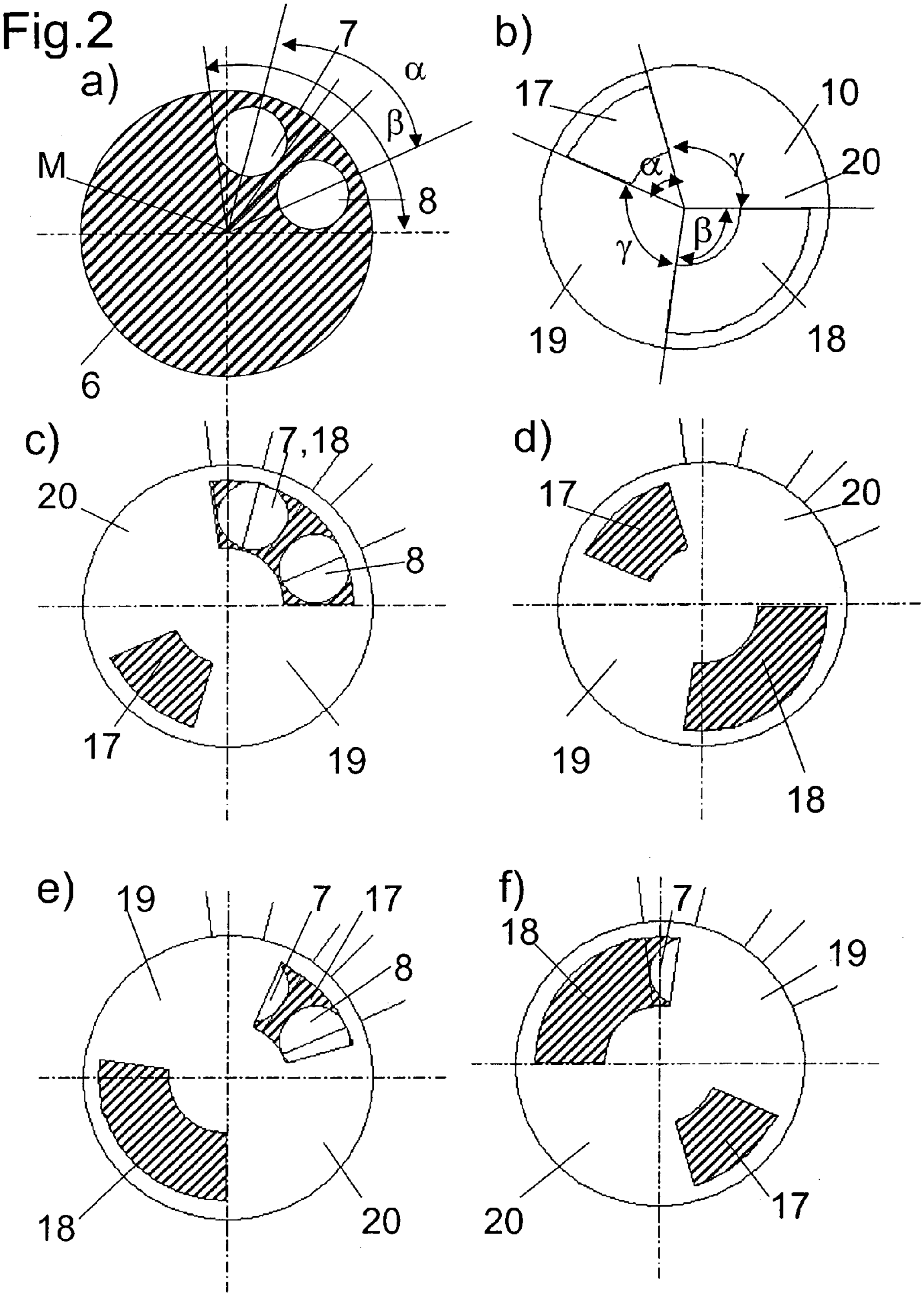
FIG. 2 shows schematically different positions of a valve disk of a two-way valve device according to the invention with respect to a valve plate in top view.

A preferred example of a form of embodiment of a valve plate 6 with respect to a valve disk 10 is shown in FIG. 2, whereby FIG. 2*a* shows a top view of the valve plate 6 and FIG. 2*b* shows a top view of the valve disk 10. In FIGS. *c* through *f* the various rotation positions of the valve element 10 with respect to the valve plate 6 are shown by way of example to facilitate the description of the functions. The passage openings 7, 8, which are embodied as round in the present exemplary embodiment, feature central axes extending respectively through a central point M of the valve plate. An angular area $\alpha$ is formed by these central axes.

Moreover an angular area $\beta$ is enclosed by the outer edges of these passage openings 7, 8 that are distant from one another. In the present exemplary embodiment the passage openings 7, 8 are arranged with respect to one another such that the closed angular area between the two passage openings is about 5°, while the extensions of the outer edges of the two passage openings 7 and 8, which extensions extend through the central point M of the valve plate 6, respectively enclose an angle of 45°. Accordingly the angular area $\alpha$ is about 50° and the angular area $\beta$ is 95°.

FIG. 2*b* shows the control openings 17, 18 of the valve disk corresponding hereto. The first control opening 17 again extends over the angular area $\alpha$ of 50° and the second control opening 18 again extends over the angular area $\beta$ of 95°. Between the control openings 17, 18 there are respectively closed faces 19, 20 that respectively extend over an angular area $\gamma$ of about 107.5°.

The interplay of the control openings 17, 18 with the passage openings 7, 8 are illustrated by FIGS. *c* through *f*.

FIG. 2*c* shows a position in which the larger control opening 18 is situated over the two passage openings 7, 8 of the valve plate 6. It is clear that one of the two passage openings 7 or 8 is closed by a slight turn in one of the two directions, while the other remains completely open. If an exhaust gas cooler is then attached to the passage opening 7 and a bypass channel to the passage opening 8, this means that when the valve disk 10 is turned, the mass flow to be sent through becomes smaller due to the total cross-section becoming narrower, whereby simultaneously the temperature drops or rises according to the closing cross-section. Accordingly two possible temperatures to be adjusted exist for each mass flow to be adjusted.

In FIG. 2*d* a position is shown in which for example no exhaust gas recirculation is desired and thus both passage openings 7, 8 are closed by one of the faces 19, 20.

In FIG. 2*e* it can now be seen that the smaller control opening 17 was turned in the area of the passage openings 7, 8. At such a setting, the overall flow cross-section does not change and thus the total mass flow does not change when the valve disk 10 is turned, yet when the passage openings 7 and 8 are connected to a cooler or a bypass channel, here a continuous temperature adjustment is possible at a constant mass flow, since the one passage opening 7 is closed or opened to the same extent as the other is opened or closed.

In FIG. 2*f* it can be seen that by an appropriate position of the valve disk 10 with respect to the valve plate 6 a pure mass flow adjustment is possible at constant temperature, whereby the exhaust gas flows only via the cooler or only via the bypass channel, in that only one of the two passage openings 7, 8 is freed, while the other is covered by the faces 19 or 20.

It is clear that by means of such an embodiment almost any desired exhaust gas recirculation stream can be adjusted with respect to temperature and mass, whereby only one control unit and one valve element need to be used for this. Thus a small, cost-effective unit can be used both to adjust the exhaust gas mass flow and also to adjust the temperature.

While the present invention has been described with reference to certain preferred embodiments, one of ordinary skill in the art will recognize that additions, deletions, substitutions, modifications and improvements can be made while remaining within the spirit and scope of the present invention as defined by the appended claims.

It should be clear that the construction of the rotary valve can be modified with respect to the arrangement and embodiment of the control unit or of the entering and exiting channels, without leaving the scope or spirit of the main claim. Changes in the arrangement of the openings of the valve plate or of the valve disk with respect to one another are also conceivable, whereby an adequate mass flow adjustment and if necessary temperature flow adjustment must be maintained.

The invention claimed is:

1. An adjustable two-way valve device for a combustion engine, comprising:

a first outlet or inlet channel;

a second outlet or inlet channel;

a valve plate having a first passage opening of the first outlet or inlet channel and a second passage opening of the second outlet or inlet channel;

a third outlet or inlet channel; and a rotary valve element having at least one control opening corresponding to one or both of the passage openings of the first and second outlet or inlet channels;

wherein the valve element is disposed to controllably open or close fluid connections between the third outlet or inlet channel and one or both of the first outlet or inlet channel and the second outlet or inlet channel, so that the openings corresponding to the first outlet or inlet channel and the second outlet or inlet channel are made independently of one another or dependent on one another, wherein the valve element comprises a valve disk, and the at least one control opening of the valve element extends in a circumferential direction over an angular area $\alpha$ essentially equal to an angular area spanned by central axes of the two passage openings running through a central point of the valve plate.

2. An adjustable two-way valve device for a combustion engine, comprising:

a first outlet or inlet channel;

a second outlet or inlet channel;

a valve plate having a first passage opening of the first outlet or inlet channel and a second passage opening of the second outlet or inlet channel;

a third outlet or inlet channel; and a rotary valve element having at least one control opening corresponding to one or both of the passage openings of the first and second outlet or inlet channels;

wherein the valve element is disposed to controllably open or close fluid connections between the third outlet or inlet channel and one or both of the first outlet or inlet channel and the second outlet or inlet channel, so that the openings corresponding to the first outlet or inlet channel and the second outlet or inlet channel are made independently of one another or dependent on one another, wherein the passage openings comprise valve seats disposed to serve as scrape edges facing the valve disk and surrounding respective ends of the first and second outlet or inlet channels.

3. An adjustable two-way valve device for a combustion engine, comprising:

a first outlet or inlet channel;

a second outlet or inlet channel;

a valve plate having a first passage opening of the first outlet or inlet channel and a second passage opening of the second outlet or inlet channel;

a third outlet or inlet channel; and a rotary valve element having at least one control opening corresponding to one or both of the passage openings of the first and second outlet or inlet channels;

wherein the valve element is disposed to controllably open or close fluid connections between the third outlet or inlet channel and one or both of the first outlet or inlet channel and the second outlet or inlet channel, so that the openings corresponding to the first outlet or inlet channel and the second outlet or inlet channel are made independently of one another or dependent on one another.

4. Adjustable two-way valve device according to claim 3, wherein at least one said control opening of said valve element extends in a circumferential direction over an angular area β essentially equal to an angular area made by connecting two outer, furthest-apart edges of said two passage openings with a central point of said valve plate.

5. An adjustable two-way valve device according to claim 3, wherein said adjustable two-way valve device is disposed in an exhaust gas recirculation line;

said first outlet or inlet channel is connected fluidly to an exhaust gas cooler;

said second outlet or inlet channel is connected fluidly to a bypass channel bypassing the exhaust gas cooler; and said third outlet or inlet channel is connected to an air intake channel system or an exhaust manifold.

6. An adjustable two-way valve device according to claim 3, wherein a first said control opening of said valve element extends in a circumferential direction over an angular area α essentially equal to an angular area spanned by central axes of said two passage openings running through a central point of said valve plate;

a second said control opening of said valve element extends in a circumferential direction over an angular area β essentially equal to an angular area made by connecting two outer, furthest-apart edges of said two passage openings with a central point of said valve plate; and said valve element features two essentially equally large closed surfaces between said two control openings.

7. An adjustable two-way valve device according to claim 6, wherein said two passage openings of said valve plate extend in a circumferential direction over an angular area of 45°, said angular area α is 50°, said first control opening extends over an angular area α of 50°;

said second control opening extends over an angular area β of 95°; and said two closed faces said valve disk extend respectively over an angular area γ of 107.5°.

* * * * *